United States Patent
Patel et al.

(10) Patent No.: US 11,748,195 B2
(45) Date of Patent: Sep. 5, 2023

(54) DETECT MULTIFOLD DISTURBANCE AND MINIMIZE READ-DISTURB ERRORS IN NAND FLASH

(71) Applicant: International Business Machines Corporation, Armonk, NY (US)

(72) Inventors: Kushal S. Patel, Pune (IN); Puja Leekha, Mumbai (IN); Subhojit Roy, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 17/568,830

(22) Filed: Jan. 5, 2022

(65) Prior Publication Data

US 2023/0214293 A1    Jul. 6, 2023

(51) Int. Cl.
*G06F 11/10* (2006.01)
*G06F 11/07* (2006.01)
*G06F 3/06* (2006.01)

(52) U.S. Cl.
CPC .......... *G06F 11/1068* (2013.01); *G06F 3/064* (2013.01); *G06F 3/0619* (2013.01); *G06F 3/0679* (2013.01); *G06F 11/076* (2013.01); *G06F 11/0772* (2013.01)

(58) Field of Classification Search
CPC .. G06F 11/0772; G06F 11/076; G06F 3/0679; G06F 3/064; G06F 3/0619; G06F 11/1068

See application file for complete search history.

(56) References Cited

U.S. PATENT DOCUMENTS

| | | | |
|---|---|---|---|
| 3,643,233 A * | 2/1972 | Fan | G11C 13/04 359/259 |
| 7,542,330 B2 * | 6/2009 | Greene | G11C 11/412 365/156 |
| 8,930,778 B2 | 1/2015 | Cohen | |
| 8,943,263 B2 | 1/2015 | Frost | |
| 9,354,816 B2 | 5/2016 | Chen | |
| 9,627,021 B2 * | 4/2017 | Poulton | G11C 8/16 |
| 10,140,042 B1 | 11/2018 | Buxton | |
| 10,372,382 B2 * | 8/2019 | Alavi | G06F 11/004 |
| 2011/0040932 A1 * | 2/2011 | Frost | G06F 11/076 711/E12.008 |

(Continued)

OTHER PUBLICATIONS

"Avoiding Flash's Read-Disturb in Storage System", An IP.com Prior Art Database Technical Disclosure, Authors et. al.: Disclosed Anonymously, IP.com No. IPCOM000258720D, IP.com Electronic Publication Date: Jun. 8, 2019, 6 pages.

(Continued)

*Primary Examiner* — Guy J Lamarre
(74) *Attorney, Agent, or Firm* — Monchai Chuaychoo (57) ABSTRACT

An approach for reducing disturbed errors in a flash memory device is disclosed. The approach includes collecting information associated with one or more; determining one or more frequently accessed data blocks from the one or more blocks based on the collected information; determining one or more neighboring blocks from the one or more blocks based on the collected information; determining if the one or more neighboring blocks exceeds a disturbance threshold; and in responsive to the one or more neighboring blocks has exceeded the disturbance threshold, re-align the one or more blocks.

20 Claims, 9 Drawing Sheets

(56) References Cited

U.S. PATENT DOCUMENTS

| | | | | |
|---|---|---|---|---|
| 2012/0284574 | A1* | 11/2012 | Avila | G11C 16/28 |
| | | | | 714/704 |
| 2013/0258762 | A1* | 10/2013 | Chih | G11C 11/161 |
| | | | | 365/158 |
| 2013/0318417 | A1* | 11/2013 | Danninger | H03M 13/2732 |
| | | | | 714/755 |
| 2014/0136884 | A1 | 5/2014 | Werner | |
| 2016/0225461 | A1* | 8/2016 | Tuers | G11C 16/26 |
| 2016/0342458 | A1* | 11/2016 | Cai | G06F 12/0246 |
| 2017/0220266 | A1* | 8/2017 | Ahmad | G06F 3/0616 |
| 2019/0279730 | A1 | 9/2019 | Wu | |
| 2020/0118636 | A1 | 4/2020 | Athreya | |
| 2020/0393974 | A1* | 12/2020 | Bahirat | G06F 3/0685 |
| 2021/0089217 | A1* | 3/2021 | Bjørling | G06F 3/064 |

OTHER PUBLICATIONS

"Method to Monitor Read Disturb in Three-Dimensional NAND Flash", An IP.com Prior Art Database Technical Disclosure, Authors et. al.: Disclosed Anonymously, IP.com No. IPCOM000263352D, IP.com Electronic Publication Date: Aug. 21, 2020, 5 pages.

Cai et al., "Read Disturb Errors in MLC NAND Flash Memory: Characterization, Mitigation, and Recovery", 2015 45th Annual IEEE/IFIP International Conference on Dependable Systems and Networks, DOI 10.1109/DSN.2015.49, pp. 438-449.

Lin et al., "Why SD Memory Cards Drive Reliable Storage in Automotive Applications", SD Association, Jul. 15, 2015, 6 pages, <https://www.sdcard.org/press/thoughtleadership/why-sd-memory-cards-drive-reliable-storage-in-automotive-applications/>.

* cited by examiner

DETECT MULTIFOLD DISTURBANCE AND MINIMIZE READ-DISTURB ERRORS IN NAND FLASH

BACKGROUND

The present invention relates generally to the field of computing, and more particularly to NAND (Not AND) flash memory.

Enterprise class storage adopted the flash storage story to gain the high speed, low latency data storage supremacy for enterprise class application data. These modern Flash drives are comprised of NAND Flash Cell mechanisms. These NAND Flash memory chips are made up as thousands of two dimensional arrays of Flash Cells. These cells are made up of NAND gates and capable of storing data in the form of a threshold voltage. There are mechanisms that supplies variety of voltages to the Flash cells for execution of distinguished operations on the flash cell. The operations often include erasing the flash cell, reading, refreshing and writing the cell data. These threshold voltages are supplied to the flash cells bit lines in the cell arrays. Reading of the flash data is performed by applying a read reference voltage one or more times to the bit line (the row/column in the two-dimensional cell where the block contents are exists) that contains the data to be read. The cells on a bit line are connected in series to the sense amplifier. In order to read from a single cell on the bit line, all of the other cells on the same bit line must switched on to allow the value being read to propagate through to the sense amplifier.

Read disturb is a well-known effect in NAND flash world wherein the reading data from one flash cell can cause the threshold voltages of other (unread) cells that are present in the same block to shift to a higher value. Even if the single time voltage application to the block is very low, but this may cause serious problem when the frequency of the occurrence increases with multiple reads and generates read disturb errors in the drives.

Simply, in the block storage drives, the reading of some blocks in the Flash drive may affect the neighboring blocks in the page because of read-disturbs experienced by these adjacent blocks. When the heavy READs are observed by a block in the storage system, associated Flash drive will also experience the more READ commands, hence certain blocks in the flash drive will be accessed multiple times via providing the read reference voltage. Because of this hot reading operations on certain set of blocks, the blocks that are near to this extremely READ hot block may experience read disturb errors. These errors are often handled at flash controller and at FTL level wherein IO counters are maintained at flash level to match the threshold and the blocks experiencing read-disturb are re-written to some other location for refreshing the contents of the flash cells. This mechanism induces write amplification inside the flash drive along with the increment in I/O latency during internal data movement.

SUMMARY

Aspects of the present invention disclose a method, a NAND flash memory system and computer program product for reducing disturbed errors in a flash memory device. The method may be implemented by one or more computer processors and may include, collecting information associated with one or more; determining one or more frequently accessed data blocks from the one or more blocks based on the collected information; determining one or more neighboring blocks from the one or more blocks based on the collected information; determining if the one or more neighboring blocks exceeds a disturbance threshold; and in responsive to the one or more neighboring blocks has exceeded the disturbance threshold, re-align the one or more blocks.

According to another embodiment of the present invention, there is provided a NAND flash memory system. The NAND flash memory system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which:

FIGS. 1A and 1B illustrate the current issues related to the read-disturbance within a flash drive, FIG. 1A illustrates the read disturb and page movement associated with a NAND flash memory, and FIG. 1B illustrates blocks, read access and associated read-disturbance;

FIGS. 3A-3D is a diagram illustrating page mapping for steps of NAND flash 200. FIG. 3A demonstrates finding the blocks that are experiencing more than one noisy neighbor.

DETAILED DESCRIPTION

Figure 1A:
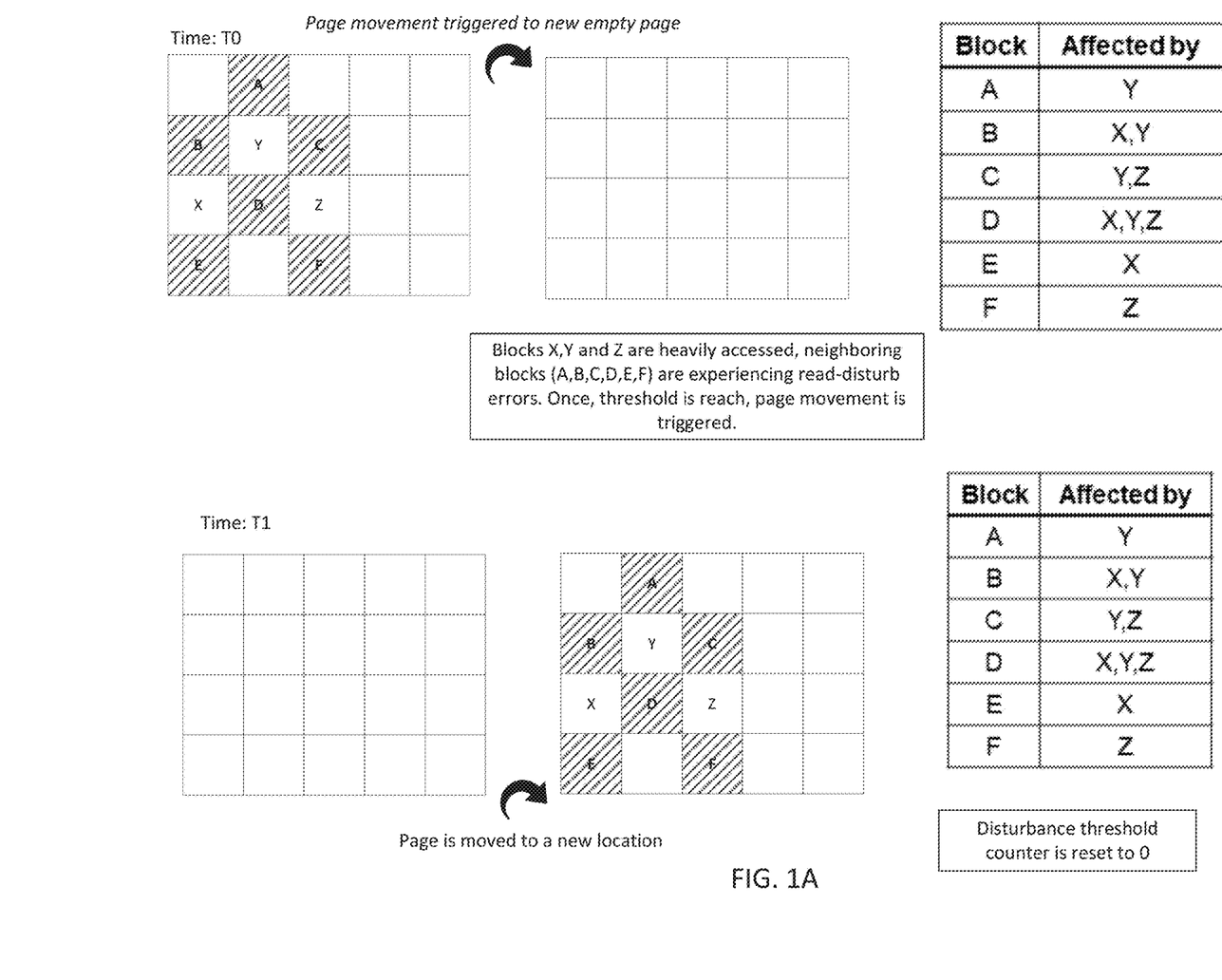
Figure 1B:
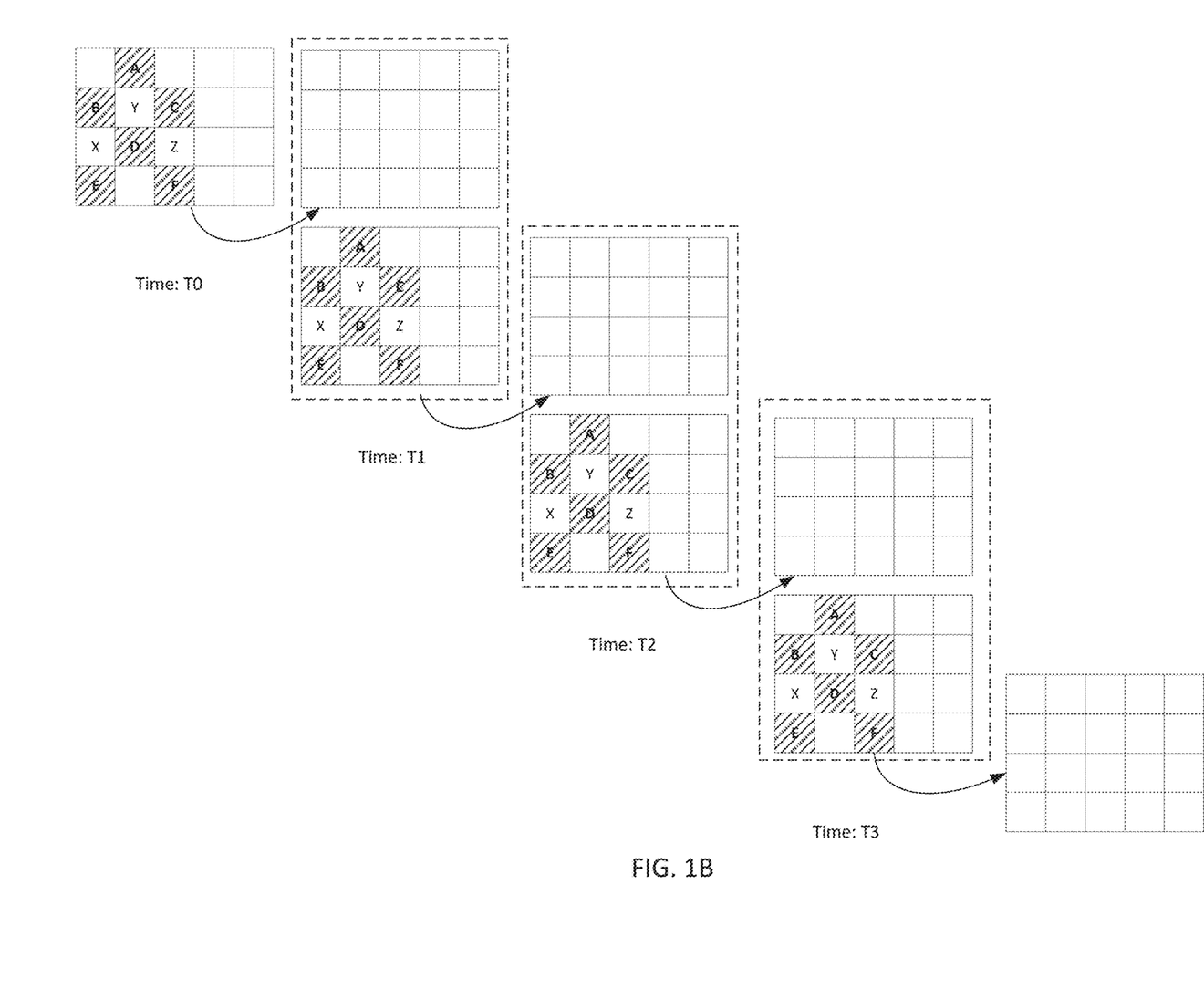

Today's Flash controllers are developed to gain the I/O (Input/Output) performance benefits and enterprise class storage system are highly using these NAND (Not AND) flash drives in the storage boxes which offers storage virtualization and other interrelated features of replication and tiering across the underlying disks in the system. These storage virtualization engines use Flash Drives as a tier-1 storage location for heavily accessed data to serve the hot data with low latency. This extent placement is performed based on the access heat temperature monitoring by tiering daemons. Because of this, the extents experiencing heavy I/O are moved to flash tier hence underlying flash drives will experience more I/O commands almost all the time. See FIGS. 1A and 1B, to understand the current issues related to the read-disturbance within a flash drive. FIG. 1A illustrates the read disturb and page movement associated with a NAND flash memory. FIG. 1B illustrates blocks, read access and associated read-disturbance.

A typical customer I/O pattern observation on the block storage device is 70% READ and 30% WRITE. As heavy READ requests are issued to some of the blocks the NAND flash drives, the neighboring blocks experiences Read-Disturb error. The FTL (Flash Translation Layer) keep the track of read disturbance for a block and in case the disturbance of a block read operation reaches to the threshold value, then the page will be re-written to new location to avoid data loss because of read-reference voltage. Re-writing the block to new location refreshes all the block level disturbance counter and the application (or upper layer systems) will start accessing the data from new page location. As the virtualization is applied at upper layer of the system like storage virtualization controller, flash blocks in the same page can be distributed and allocated to different applications which are performing IO operations. Further, each application's data access requirements are different hence all the blocks in the pages are not READ-hot at the same time. During the peak time of data access, some blocks in the NAND Flash pages are heavily accessed, while other blocks in the same page are accessed with comparatively less frequency.

When the page is rewritten to new location, as one (or more) blocks in the page has reached to read disturb threshold, the complete page is moved to new physical location with the same block location mapping in the page.

Once the disk drive's FTL detects that the read-disturb threshold is reached, then it internally moves the data to another location by writing complete page and FTL level LBA mapping table is updated. This increases the write amplification in the drive. Because of this, if the same block is accessed heavily in near furfure (which is the most common scenario), then the Flash Transition Layer need to move the page again to new location to save the neighboring blocks from data loss. This results into multiple movement operation of Flash pages by FTL and hence increased write amplification of drive. Increment in internal write amplification decreases the life of the drive and allow gives performance penalties for the application which are accessing the data which is continuously moving internally within the flash drive.

The current state of art as it pertains to reading/writing NAND flash technology can present some challenges. For example, there is no mechanism today which can perform efficient data movement when the page is experiencing read disturbance. The Flash Translation Logic t keeps the track of pages and physical address translation which will be performed while moving the pages within the drives and resetting the read-disturbance threshold for blocks. In the traditional approaches, as the same data is experiencing read-disturbance throughout the life cycle, there are changes of data corruption which may cause a serious trouble to the storage system vendors and hence it become more important to handle these cases efficiently with novel aspects of minimizing read-disturb errors in the Flash drives.

Embodiments of the present invention recognizes the deficiencies in the current state of art effective handling of noisy blocks in the flash drive and reduces the Read-Disturb errors on the flash drives and provides an approach. One approach comprise of a method and apparatus in the flash translation layer of NAND flash disks, co-existing with read-disturb measurement and internal amplification of the pages in the flash drives which will compare the read disturbance of each block and pages and along the blocks in the page using optimal way by which read disturbance can be minimized. When the page is rewritten to new location, as one (or more) blocks in the page has reached to read-disturb threshold, the complete page is moved to a new physical location with the same block location mappings in the page.

Some embodiments of the present invention may recognize one or more of the following facts, potential problems, potential scenarios, and/or potential areas for improvement with respect to the current state of the art: (i) can perform efficient data movement when the page is experiencing read disturbance, (ii) reduces the chances of data corruption which is directly related to revenue and user experience, (iii) offers effective handling of noisy blocks in the flash drive and rescues the read disturb errors on the flash drives, (iv) handle the read disturb errors efficiently and avoids more blocks to be disturbed because of heavy read operations on the flash drives, (v) analysis of READ hot data and optimal block placement at the time of amplification tiering for read-disturbance error mitigation.

Other advantages by embodiment may include, the following: (i) reduces chances of data loss due to read disturbance in the flash drive, (ii) minimizes the data loss situations by placing the blocks in suitable locations, (iii) minimizes WRITE amplification in flash drives which offer drive endurance and more SSD life, (iv) saves DWPDs of drive which can be utilized to cater application write operations and increase system performance, (v) minimizes read-disturb errors in the flash controller that give performance benefits as pages will not be moved frequently inside the flash drive (vi) detects the multi-fold disturbance which is highly sensitive for data loss and operates it in optimal way which allows longer disk life, (vii) provides way for transparent adjustment of noisy blocks without application interference, (viii) reduces read-disturb errors hence more durability can be achieved for enterprise class application data.

Some embodiments of the present invention provides a step of having a Flash Translation Layer (FTL) of NAND flash disks, co-existing with existing read-disturb measurement and internal amplification of the pages in the flash drives, which will compare the read disturbance of each block pages and align the blocks in the pages using optimal way by which read disturbance can be minimized.

Some embodiments of the present invention provides a step of identifying read disturb errors for the page and in case the FTL has decided to move the page to other location, the system is triggered to re-align the blocks in within the page.

Some embodiments of the present invention provides a step of collecting the information from FTL about the read-disturb errors experienced by the blocks using an in-bound API interface and retrieve the READ/access counters for each block in the page.

Some embodiments of the present invention provides a step of identifying the data about which blocks are creating more noise and disturbing more neighbors and re-aligning the blocks in the page so that they should possess minimum number of valid neighboring blocks.

Some embodiments of the present invention provides a step wherein, Flash Translation Layer contains the map of valid and invalid blocks in the page, and this block-validation-map is collected and used during block placement inside the page.

Some embodiments of the present invention provides a step of detecting how many neighbors are disturbing the blocks and accordingly the placement decisions are made.

Some embodiments of the present invention provides a step of moving the blocks in such a way by which the multiple disturbing elements should not affect the single block in the page.

Some embodiments of the present invention provides a step of selecting block locations based on its access counters.

Some embodiments of the present invention provides a step wherein, once the page movement is triggered because of read-disturbance mitigation, the system receives a SIGNAL from Flash Translation Layer to swap the blocks for avoiding future disturbance.

Some embodiments of the present invention provides a step wherein, upon reception of the SIGNAL, the in-bound commands are triggered to FTL which then captures physical location map (i.e., physical LBA to page-block mapping).

Some embodiments of the present invention provides a step of determining suitable locations based on its policies and selects the target block location in the page.

Some embodiments of the present invention provides a step wherein, once all the locations are optimally decided, the page is provided to FTL for writing at new location.

Some embodiments of the present invention provides a step wherein, while writing the page to new location, the map change information is also sent to FTL and in response to this the physical LBA to block-page mapping is updated to ensure consistency.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 2:
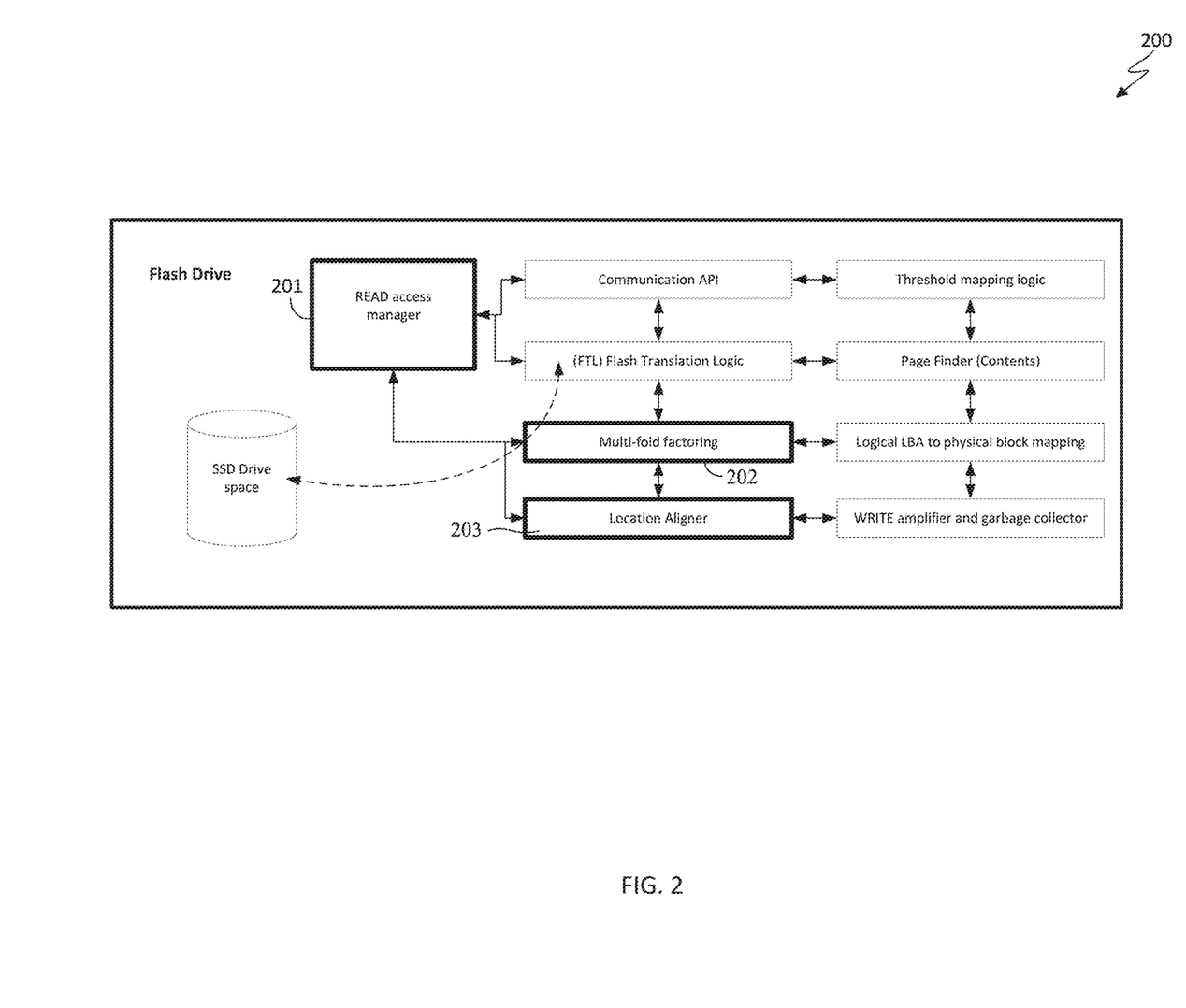
FIG. 2 is a functional block diagram illustrating the system architecture of minimizing read-disturb errors in NAND flash, designated as NAND flash 200, in accordance with an embodiment of the present invention.

FIG. 2 is a functional block diagram illustrating the system architecture of minimizing read-disturb errors in NAND flash, designated as NAND flash 200, in accordance with an embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. It should be understood that the Figures are merely schematic and are not drawn to scale. It should also be understood that the same reference numerals are used throughout the Figures to indicate the same or similar parts.

NAND flash 200 adds a few unique components that are do not exist in a typical NAND flash memory architecture. For examples, those components include READ access manager 201, multi-fold factoring 202 and location aligner 203. READ access manager 201 keeps a track of the disturbance for each block, communicates with the rest of existing components, and manages the multi-fold factoring 202 and location aligner 203. Both multi-fold factoring 202 and location aligner 203 are involved in re-arranging blocks in the new page based on the alignment algorithm.

Generally, these subcomponents interact with existing subcomponents, such as, FTL (Flash Translation Layer) and co-exist with read-disturb measurement and internal amplification of the pages in the flash drives. These components, collectively, can compare the read disturbance of each block the pages and align the blocks in the pages using optimal way by which read disturbance could be minimized.

Figure 3A:
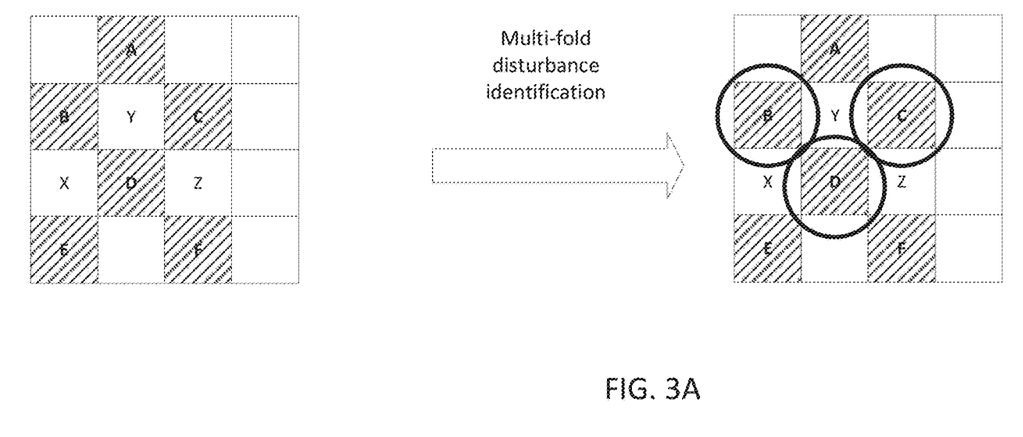
Figure 3B:
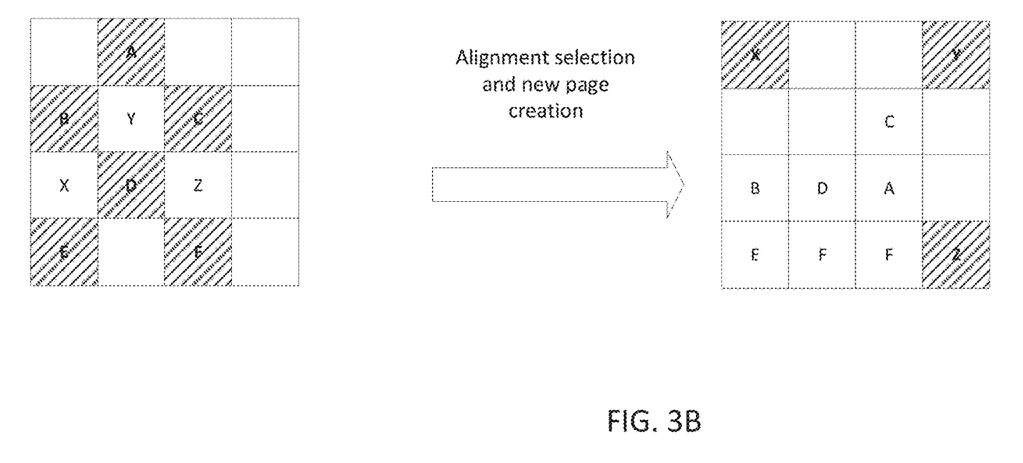
FIG. 3B demonstrates repositioning of blocks in the page when movement is because of read error and FIG. 3C demonstrates find the corner places for disturbed data block sand data placement logic.

FIGS. 3A-3B is a diagram illustrating page mapping for steps of NAND flash 200. FIG. 3A demonstrates finding the blocks that are experiencing more than one noisy neighbor (i.e., identifying multi-fold disturbance). FIG. 3B demonstrates repositioning of blocks in the page when movement is because of read errors (i.e., alignment selection and new page creation).

Figure 3C:
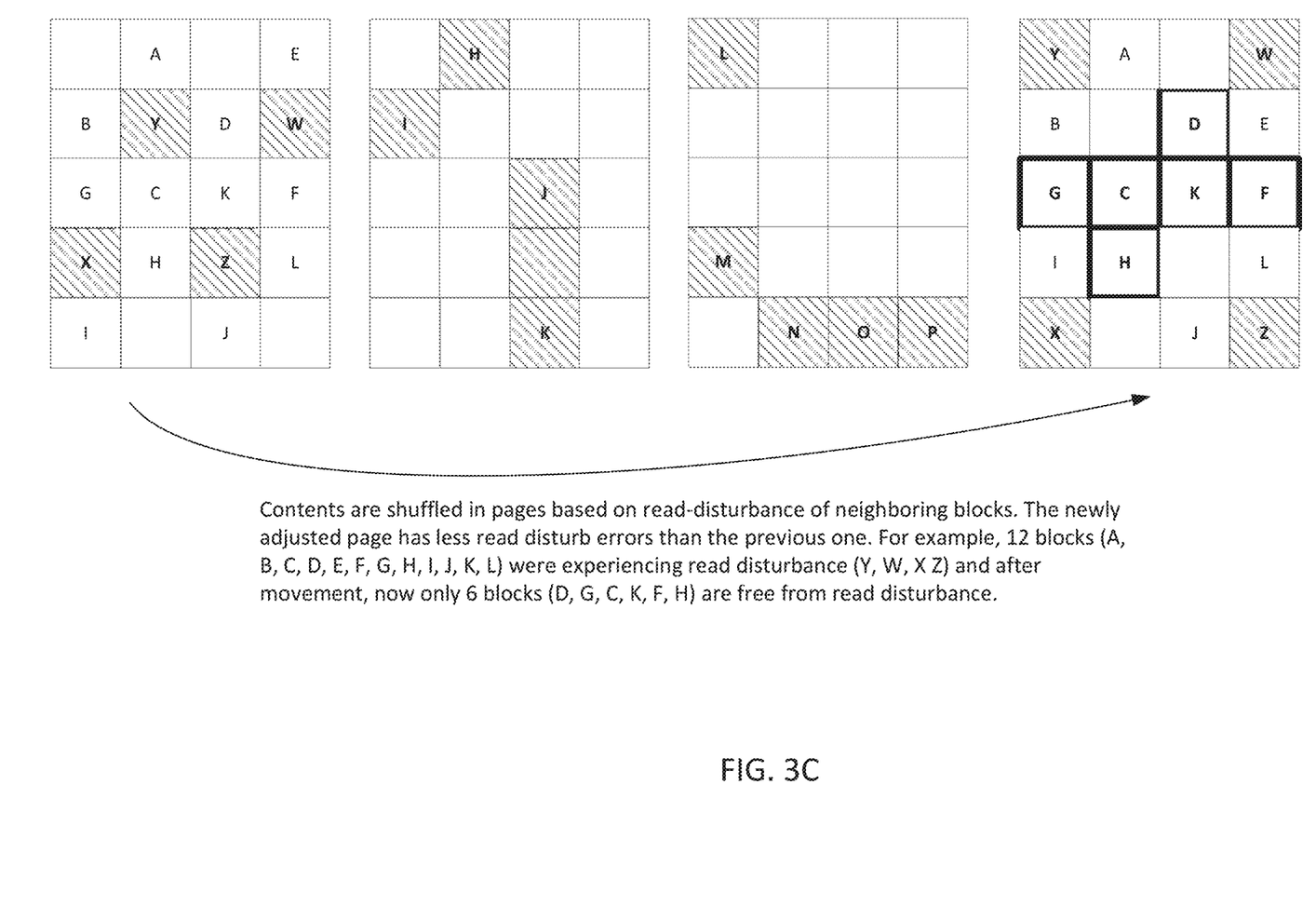

FIG. 3C demonstrates find the corner places for disturbed data block sand data placement logic. The contents are shuffled in a page based on read-disturbance of the neighboring blocks. The newly adjusted page has less read disturb errors than the previous one. Previously, 12 blocks were experiencing read disturb and after movement, 6 blocks experiencing read-disturb and embodiment were able to free 6 blocks from read disturbance.

Figure 3D:
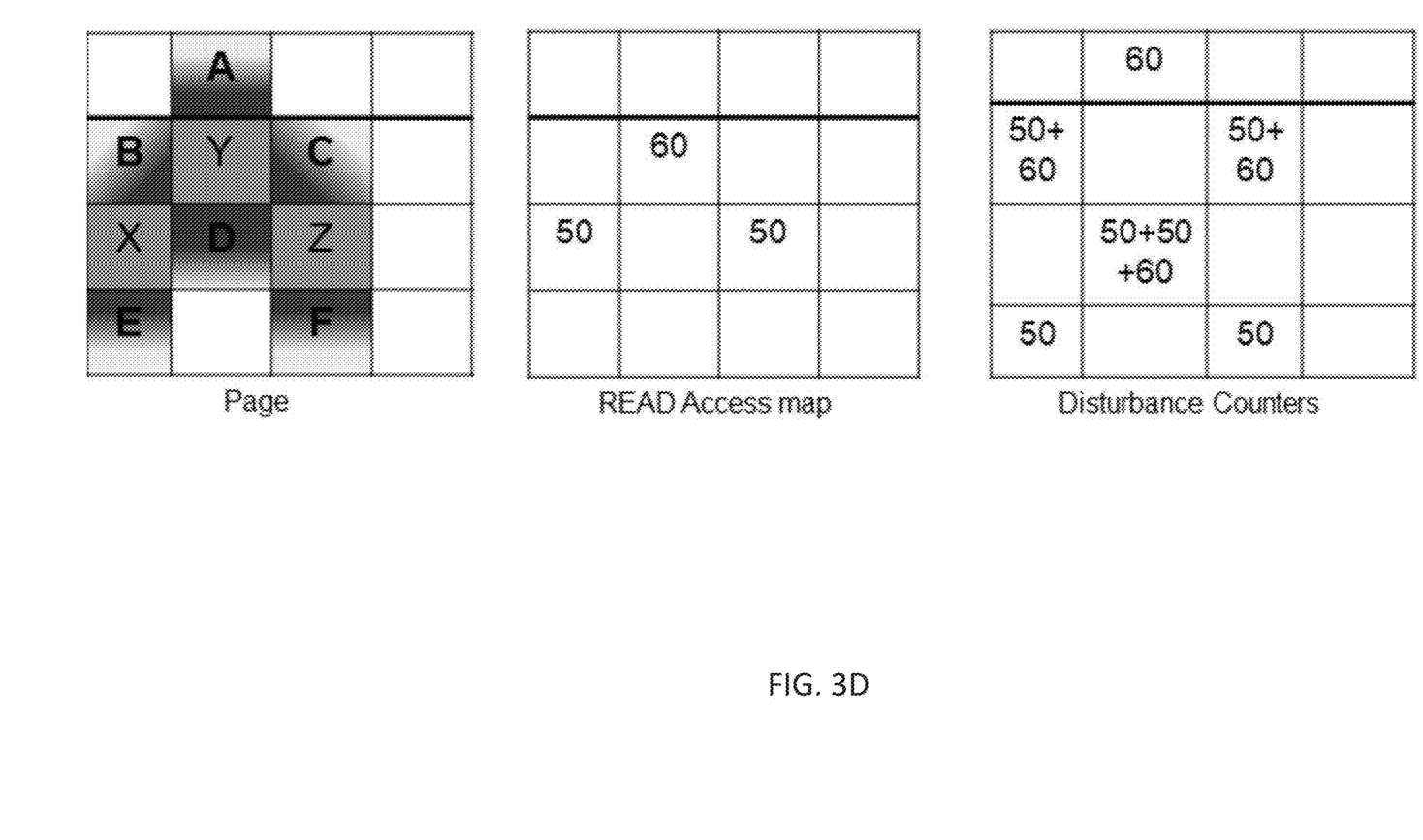
FIG. 3D illustrates a general mapping for the page, READ access and disturbance counters with sample values attributed to read errors (i.e., before NAND flash 200 realigns)

FIG. 3D illustrates a general mapping for the page, READ access and disturbance counters with sample values attributed to read errors (i.e., before NAND flash 200 realigns).

A high level general steps of one embodiment of NAND flash 200 can be described as, in no particular order, (1) identifying the read disturb errors for the page and the FTL has decided to move the page to other location, (2) location aligner is triggered to re-align the blocks in within the page, (3) collecting the information from FTL about the read-disturb errors experienced by the blocks using an in-bound API interface, (4) retrieving the counters access values for each block in the page, where all of the information is used to determine, by analyzing the data, which blocks are creating more noise and disturbing more neighbors, (5) re-aligning, by location aligner 203, the blocks based an alignment algorithm.

Alignment algorithm can be described by way of various scenarios. In one scenario, where NAND flash 200 has detected that some limited blocks are heavily accessed and because of which many other blocks are experiencing read disturb errors, then these blocks are re-aligned in the page so that they should possess minimum number of valid neighboring blocks. Flash Translation Layer contains the map of valid and invalid blocks in the page, this block-validation-map is collected and used during block placement inside the page.

In another scenario, where the detected blocks are experiencing disturbance from more than one peer, the alignment algorithm can detect how many neighbors are disturbing the blocks and accordingly the placement decisions are made. For example, if there is more than one block is injecting read-disturbance to the block, the amplification increases by multiple folds as the block reaches to disturbance threshold quickly. Location aligner moves the blocks in such a way by which the multiple disturbing elements should not affect the single block in the page.

In another scenario, alignment algorithm may utilize access counters. For example, once the page movement is triggered because of the read-disturbance mitigation, Location aligner receives a SIGNAL from Flash Translation Layer to swap the blocks for avoiding future disturbance. Upon reception of the SIGNAL, the in-bound commands are triggered to FTL which then captures physical location map (i.e., physical LBA to page-block mapping). This information is used along with the access counters of each block in the page and existing disturbance values. Then location aligner determines suitable locations based on its previously mentioned scenario and selects the target block location in the page. Once all the locations are optimally decided, the page is provided to FTL for writing at new location. While writing the page to new location, the map change information is also sent from location aligner daemon to FTL. In response to this command, the physical LBA to block-page mapping is updated to ensure consistency.

Figure 4:
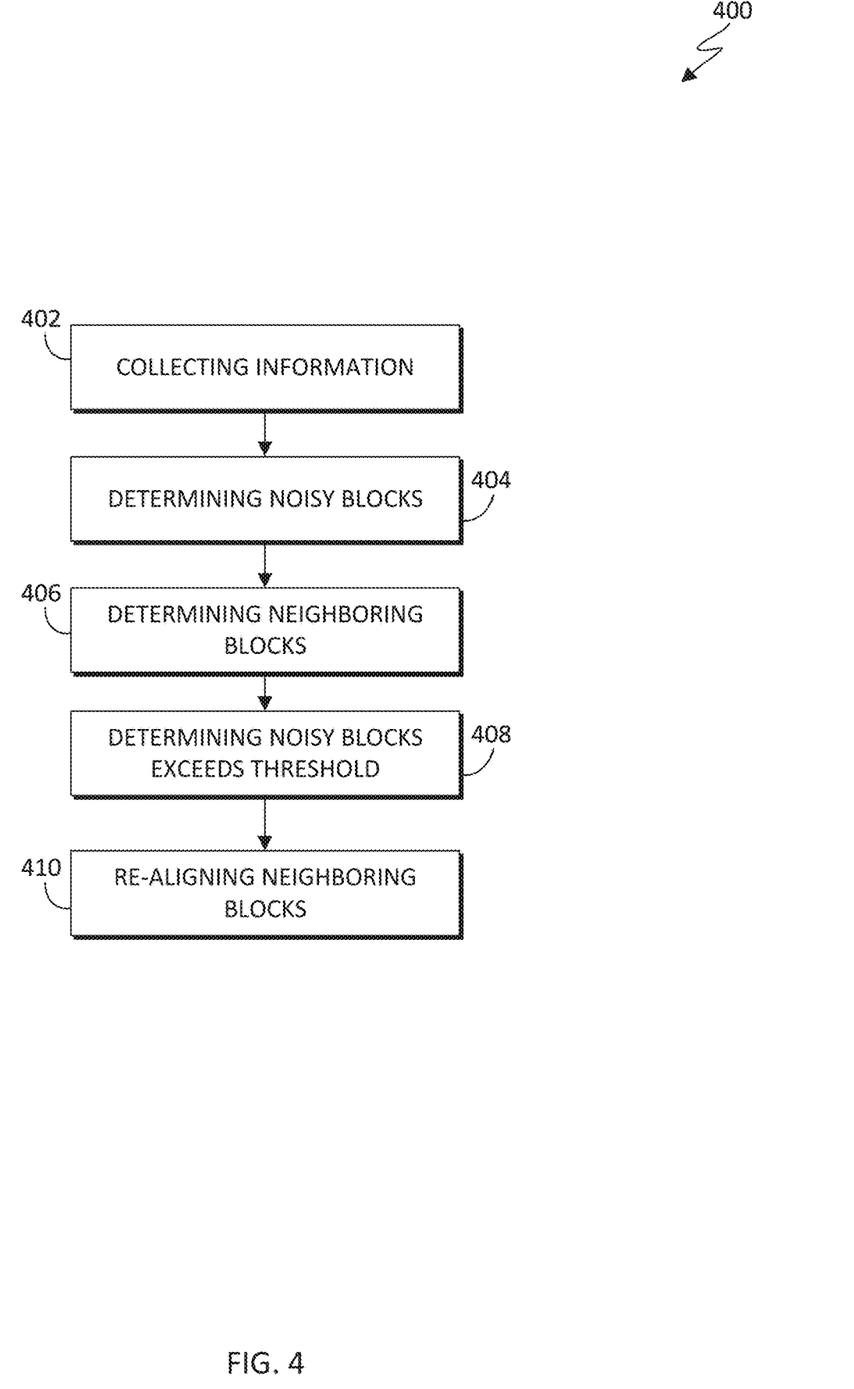
FIG. 4 is a high-level flowchart illustrating the operation of NAND flash 200, designated as 400, in accordance with another embodiment of the present invention.
Figure 5A:
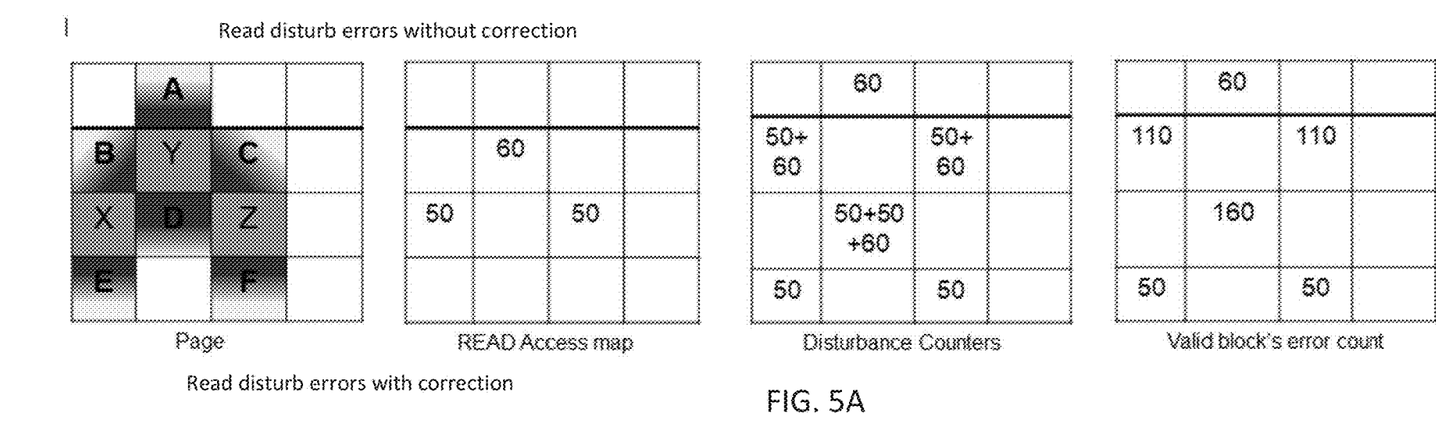
FIGS. 5A and 5B illustrate the block page mapping before (i.e., read disturb errors) and after utilizing NAND flash 200 (error correction)
Figure 5B:
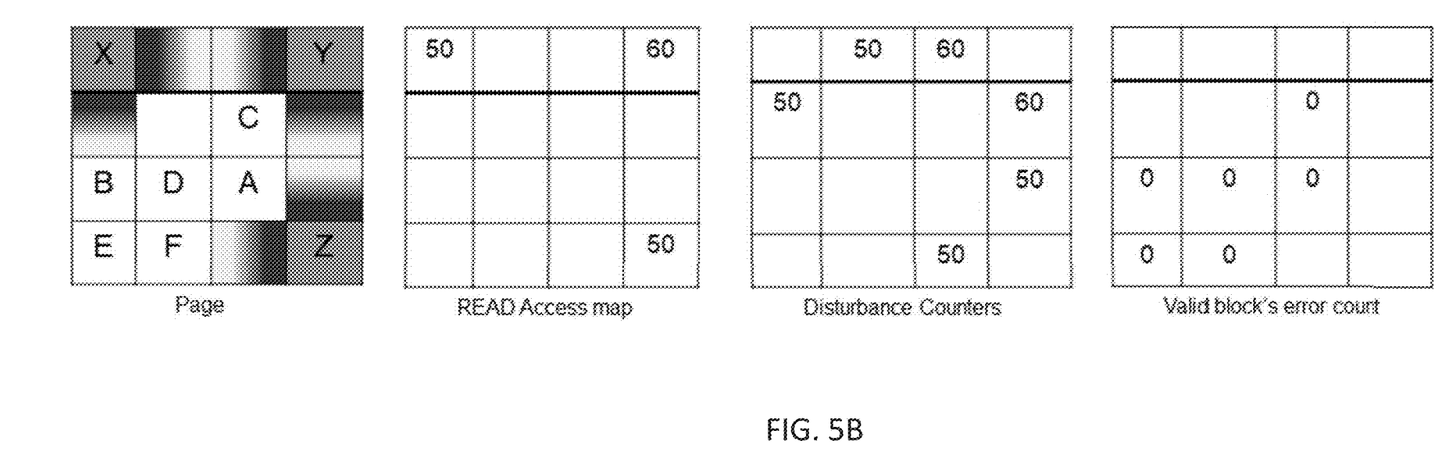

FIG. 4 is a high-level flowchart illustrating the operation of NAND flash 200, designated as 400. Steps of NAND flash 200 can be summarized with blocks 402 to 410. It can be helpful to refer to FIGS. 5A-5B as examples since FIGS. 5A and 5B illustrates the block page mapping before (i.e., read disturb errors) and after utilizing NAND flash 200 (error correction).

Block 402 illustrates the step of collecting information associated with one or more blocks from an FTL (flash translation layer) component. The collected information can include, but it is not limited to, READ access counter value for each counter associated with the one or more blocks, read disturb error values associated with the one or more blocks and a block-validation-mapping associated with the one or more blocks (i.e., physical location of blocks with data, without data, with errors, without errors all located within a page).

Block 404 illustrates the step of determining one or more frequently accessed data block from the one or more blocks. Recall that the collected information can contain READ access counter value for each block. A read access counter value means that, how many times has data containing in that particular block was access. Some block may be accessed (READ) more frequently than other blocks. How is frequently accessed define? Frequently accessed can be defined by a READ access block threshold. READ access block threshold is a predetermined number, defined by the user and/or system. For example, READ access block threshold is set at 40 (i.e., data was access 40 times for any given block). Thus, blocks, X, Y and Z have read access counter value of 50, 60 and 50, respectively (refer to FIG. 5A). Other blocks, A, B, C, D, E and F are valid data block and have a value of 10 (not shown in FIG. 5B) but are not considered frequently access data block because their values do not exceed the 40 count threshold.

Block 406 illustrates the step of determining one or more neighboring blocks next to the one or more frequently accessed data block blocks based on the collected information. Neighboring blocks are valid blocks with data but are not frequently access (i.e., below a READ access block threshold) but are adjacent (refer to PAGE and READ Access map of FIG. 5A). For example, blocks such as A, B, C, D, E, and F would be considered as neighboring blocks. After determining the location of the neighboring blocks, each block will have to tally up the READ access counter values based on the frequently accessed data block. Block A only borders block Y (value of 60) and thus, block A will be assigned value of disturbance counter value of 60. Block B borders block Y and X. Recall that the READ access counter value for Y and X is 60 and 50, respectively. Due to the proximity location to both frequently access data block, block B will be assigned a valid block error count of 50+60=110. This step of determining/tallying up valid block error count values is repeated for all of remaining data blocks (e.g., B through F) on the page.

Block D, is a bit unique since it is adjacent to two valid frequently access blocks, X, Y and Z (X=50, Y=60 and Z=50). Thus, valid block error count for block D is 160 (i.e., 50+60+50=160). It is noted that "valid block error count value" is a combined value of multiple READ access counter value.

Block 408 illustrates the step of determining if the one or more neighboring blocks exceeds a disturbance threshold. NAND flash 200 determines if any valid data block has the valid block error count value exceed the read-disturb error threshold. The read-disturb error threshold is a predetermined value that is defined by the user and/or system. This is a threshold that determines if the data block on a page needs to be re-aligned/moved to minimize access disturbance. Continuing with FIG. 5A, it can be understood that block D's values (D=160) exceed the read-disturb error threshold (i.e., comparing 160 against a value=130).

Block 410 illustrates the step of re-align the one or more blocks by location aligner 203. There are two options/path of re-aligning the blocks. The first option is re-arranging invalid data blocks (garbage blocks) to be adjacent to the frequently access data blocks (see FIG. 5B). The first option is fully illustrated by FIG. 5B. NAND flash 200 determine that it was best to move block X, Y and Z to the corner of page next to empty/invalid data blocks. Furthermore, NAND flash 200 also determine the rest of data blocks A through F should be arranged on the page as not to be adjacent to the frequently accessed data blocks (i.e., the valid block error count value of each valid data block does not exceed the read-disturb error threshold).

The second option is re-arranging valid blocks (e.g., frequently access data block and other data block) on a page where each individual blocks are not immediately adjacent to each other and each valid block error count of those individual blocks do not exceed the read-disturb error threshold.

Figure 6:
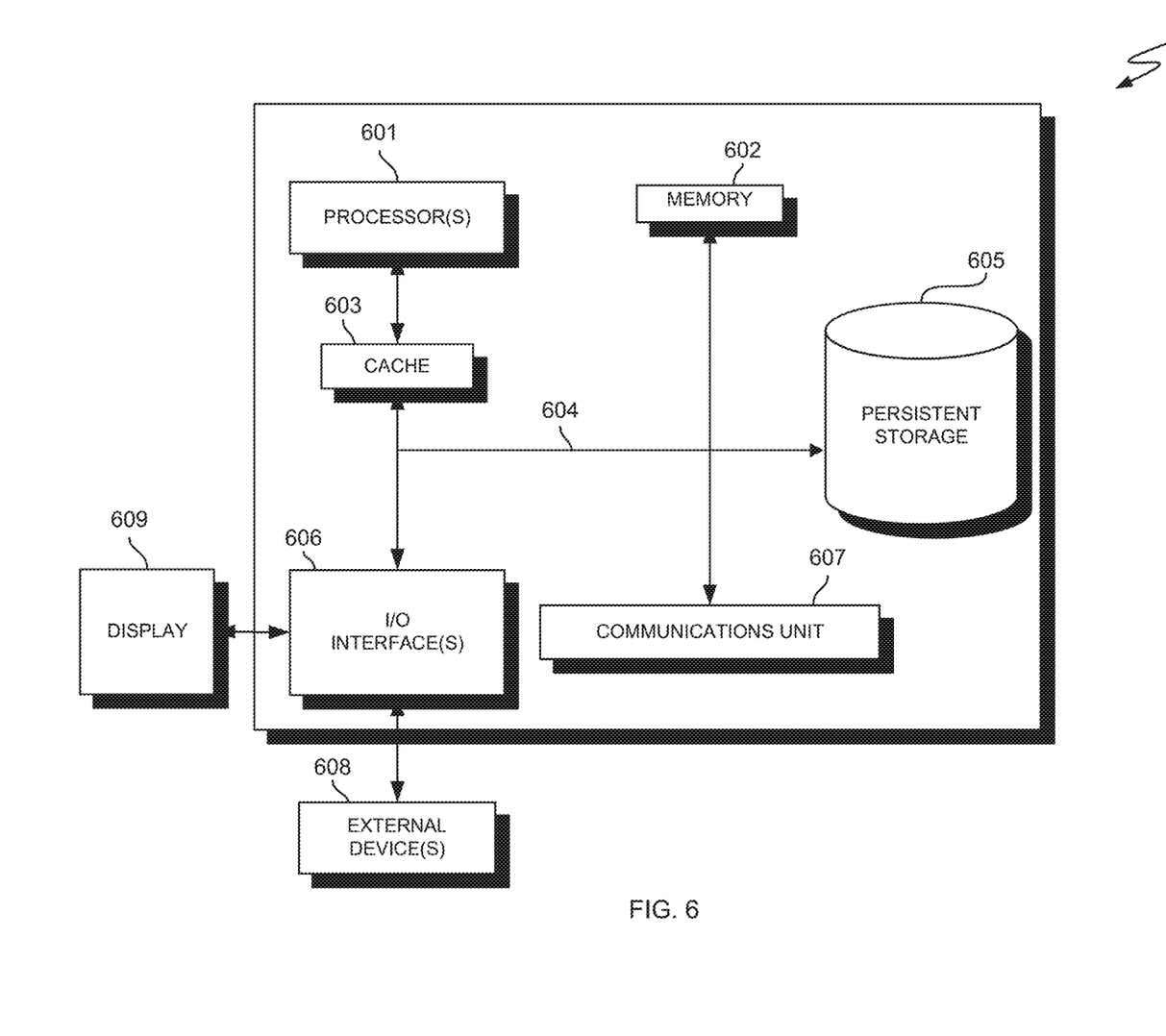
FIG. 6 depicts a block diagram, designated as 600, of components of a server computer capable of executing the operational steps of NAND flash 200 (and or 400), in accordance with an embodiment of the present invention.

FIG. 6 designated as 600, depicts a block diagram of components of patient component 111 application, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

FIG. 6 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data (e.g., software and data x10) used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Steps of NAND flash 200 can be stored in persistent storage 605 for access and/or execution by one or more of the respective processor(s) 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data (e.g., operational steps of NAND flash 200) used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Program instructions and data (e.g., operational steps of NAND flash 200) used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for reducing disturbed errors in a flash memory device, the computer-method comprising:
    collecting information associated with one or more;
    determining one or more frequently accessed data blocks from the one or more blocks based on the collected information;
    determining one or more neighboring blocks from the one or more blocks based on the collected information;
    determining if the one or more neighboring blocks exceeds a read-disturb error threshold; and
    in responsive to the one or more neighboring blocks has exceeded the read-disturb error threshold, re-align the one or more blocks.

2. The computer-implemented method of claim 1, wherein collecting information, further comprising:
    retrieving the collected information from a read access manager component and FTL (flash translation layer) component associated with the flash memory device.

3. The computer-implemented method of claim 2, wherein re-align the one or more blocks, further comprising:
    moving the one or more frequently accessed data blocks to a first location of a new page, wherein the first location has no more than two directly adjacent blocks and the two adjacent blocks does not contain any stored data; and
    moving the one or more neighboring blocks to a second location of the new page, wherein the second location is not directly adjacent to the one or more frequently accessed data blocks and the valid block error count of each of the one or more neighboring blocks does not exceed the read-disturb error threshold.

4. The computer-implemented method of claim 2, wherein re-align the one or more blocks, further comprising:
    moving the one or more frequently accessed data blocks to a second location of a new page, wherein the one or more frequently accessed data blocks is not adjacent to the one or more neighboring blocks and/or the valid block error count of each of the one or more neighboring blocks does not exceed the read-disturb error threshold.

5. The computer-implemented method of claim 1, wherein the information further comprises of block physical location mapping, one or more disturbance counter values and one or more READ access counter values.

6. The computer-implemented method of claim 5, wherein determining the one or more frequently accessed data blocks from the one or more blocks is based on the one or more READ access counter values of each block of the one or more frequently accessed data blocks have a value exceeding a READ access block threshold.

7. The computer-implemented method of claim 5, wherein determining one or more neighboring blocks next to the one or more frequently accessed data blocks further comprising:

designating one or more adjacent blocks to the one or more frequently accessed data blocks by determining whether the one or more adjacent blocks have stored data;

assigning the one or more adjacent blocks with the one or more READ access counter values; and incrementing a valid block error count for each block of the one or more adjacent blocks by adding the one or more READ access counter value from each the one or more valid data blocks.

8. The computer-implemented method of claim 7, wherein determining if the one or more neighboring blocks exceeds a read-disturb error threshold, further comprises:

comparing the disturbance counter value for each of the block for the one or more adjacent blocks exceeds the read-disturb error threshold.

9. A computer program product for reducing disturbed errors in a flash memory device, further comprising:

one or more computer readable storage media, and program instructions collectively stored on the one or more computer readable storage media when executed, the program instructions comprising instructions programmed to perform:

collecting information associated with one or more;

determining one or more frequently accessed data blocks from the one or more blocks based on the collected information;

determining one or more neighboring blocks from the one or more blocks based on the collected information;

determining if the one or more neighboring blocks exceeds a read-disturb error threshold; and in responsive to the one or more neighboring blocks has exceeded the read-disturb error threshold, re-align the one or more blocks.

10. The computer program product of claim 9, wherein collecting information, further comprising:

retrieving the collected information from a read access manager component and FTL (flash translation layer) component associated with the flash memory device.

11. The computer program product of claim 10, wherein re-align the one or more blocks, further comprising:

moving the one or more frequently accessed data blocks to a first location of a new page, wherein the first location has no more than two directly adjacent blocks and the two adjacent blocks does not contain any stored data; and moving the one or more neighboring blocks to a second location of the new page, wherein the second location is not directly adjacent to the one or more frequently accessed data blocks and the valid block error count of each of the one or more neighboring blocks does not exceed the read-disturb error threshold.

12. The computer program product of claim 10, wherein re-align the one or more blocks, further comprising:

moving the one or more frequently accessed data blocks to a second location of a new page, wherein the one or more frequently accessed data blocks is not adjacent to the one or more neighboring blocks and/or the valid block error count of each of the one or more neighboring blocks does not exceed the read-disturb error threshold.

13. The computer program product of claim 9, wherein the information further comprises of block physical location mapping, one or more disturbance counter values and one or more READ access counter values.

14. The computer program product of claim 13, wherein determining the one or more frequently accessed data blocks from the one or more blocks is based on the one or more READ access counter values of each block of the one or more frequently accessed data blocks have a value exceeding a READ access block threshold.

15. The computer program product of claim 14, wherein determining one or more neighboring blocks next to the one or more frequently accessed data blocks further comprising:

designating one or more adjacent blocks to the one or more frequently accessed data blocks by determining whether the one or more adjacent blocks have stored data;

assigning the one or more adjacent blocks with the one or more READ access counter values; and incrementing a valid block error count for each block of the one or more adjacent blocks by adding the one or more READ access counter value from each the one or more valid data blocks.

16. The computer program product of claim 15, wherein determining if the one or more neighboring blocks exceeds a read-disturb error threshold, further comprises:

comparing the disturbance counter value for each of the block for the one or more adjacent blocks exceeds the read-disturb error threshold.

17. A NAND memory flash system, the NAND memory flash system comprising:

a READ access manager component;

a multi-fold factoring component coupled and a location aligner component coupled to the READ access manager component; and a plurality of existing NAND subcomponents coupled to the READ access manager component.

18. The e NAND memory flash system of claim 17, further comprising:

a READ access manager component, the multi-fold factoring component and the location aligner component are configured to perform:

collecting information associated with one or more;

determining one or more frequently accessed data blocks from the one or more blocks based on the collected information;

determining one or more neighboring blocks from the one or more blocks based on the collected information;

determining if the one or more neighboring blocks exceeds a disturbance threshold; and in responsive to the one or more neighboring blocks has exceeded the read-disturb error threshold, re-align the one or more blocks.

19. The NAND memory flash system of claim 17, wherein re-align the one or more blocks further comprising:

moving the one or more frequently accessed data blocks to a second location of a new page, wherein the one or more frequently accessed data blocks is not adjacent to the one or more neighboring blocks and/or valid block error count of each of one or more neighboring blocks does not exceed read-disturb error threshold.

20. The NAND memory flash system of claim 17, wherein re-align the one or more blocks further comprising:

moving one or more frequently accessed data blocks to a first location of a new page, wherein the first location has no more than two directly adjacent blocks and the two adjacent blocks does not contain any stored data; and moving the one or more neighboring blocks to a second location of the new page, wherein the second location is not directly adjacent to the one or more frequently accessed data blocks and the valid block error count of each of the one or more neighboring blocks does not exceed the read-disturb error threshold.

\* \* \* \* \*